(12) United States Patent
Acharya et al.

(10) Patent No.: US 8,949,886 B2
(45) Date of Patent: Feb. 3, 2015

(54) TARGETED ADVERTISEMENT INSERTION WITH INTERFACE DEVICE ASSISTED SWITCHING

(75) Inventors: Swarup Acharya, New Providence, NJ (US); Bhawna Gupta, Edison, NJ (US); Anurag Srivastava, New Providence, NJ (US)

(73) Assignee: Alcatel Lucent, Boulogne Billancourt (FR)

( * ) Notice: Subject to any disclaimer, the term of this patent is extended or adjusted under 35 U.S.C. 154(b) by 786 days.

(21) Appl. No.: 11/764,472

(22) Filed: Jun. 18, 2007

(65) Prior Publication Data

US 2008/0313669 A1 Dec. 18, 2008

(51) Int. Cl.
*H04N 7/10* (2006.01)
*H04L 29/06* (2006.01)

(52) U.S. Cl.
CPC .......... *H04L 65/605* (2013.01); *H04L 65/4084* (2013.01)
USPC .............................................. 725/34; 725/38

(58) Field of Classification Search
USPC ........................................ 725/32, 34–36, 38
See application file for complete search history.

(56) References Cited

U.S. PATENT DOCUMENTS

| | | | |
|---|---|---|---|
| 6,340,987 B1 * | 1/2002 | Hayashi | 348/14.01 |
| 6,698,020 B1 * | 2/2004 | Zigmond et al. | 725/34 |
| 7,203,758 B2 | 4/2007 | Cook et al. | |
| 7,349,430 B1 * | 3/2008 | Chapman | 370/468 |
| 7,530,086 B2 * | 5/2009 | Brassil | 725/32 |
| 2002/0087978 A1 | 7/2002 | Nicholson et al. | |
| 2002/0104086 A1 * | 8/2002 | Tomsen et al. | 725/42 |
| 2004/0194130 A1 | 9/2004 | Konig et al. | |
| 2004/0210944 A1 | 10/2004 | Brassil et al. | |
| 2004/0244035 A1 | 12/2004 | Wright et al. | |
| 2005/0015816 A1 | 1/2005 | Christofalo et al. | |
| 2005/0039205 A1 | 2/2005 | Riedl | |

(Continued)

FOREIGN PATENT DOCUMENTS

JP 2001298672 A 10/2001
WO WO0219581 3/2002

(Continued)

OTHER PUBLICATIONS

U.S. Appl. No. 11/427,879 filed in the name of A. Acharya et al., filed Jun. 30, 2006 and entitled "Signal Distribution System with Interrupt Processing and Trick Play Functionality."

(Continued)

*Primary Examiner* — Farzana Hossain
(74) *Attorney, Agent, or Firm* — Ryan, Mason & Lewis, LLP (57) ABSTRACT

Advertisements or other types of targeted information are delivered to a set-top box or other user interface device of signal distribution system. In one aspect of the invention, a detection server of the system detects at least one cue associated with a first media stream, and generates timing information from the detected cue. The timing information is signaled to the interface device. An advertisement server of the system generates a second media stream containing targeted information for delivery to the user interface device. The user interface device switches from the first stream to the second stream based on the timing information. The timing information may also be signaled by the detection server to the advertisement server, for use in controlling generation of the second stream.

22 Claims, 7 Drawing Sheets

(56) References Cited

U.S. PATENT DOCUMENTS

| | | | |
|---|---|---|---|
| 2005/0193410 A1* | 9/2005 | Eldering | 725/34 |
| 2005/0210502 A1* | 9/2005 | Flickinger et al. | 725/34 |
| 2006/0259927 A1 | 11/2006 | Acharya et al. | |
| 2006/0277576 A1 | 12/2006 | Acharya et al. | |
| 2007/0022032 A1 | 1/2007 | Anderson et al. | |
| 2007/0055985 A1* | 3/2007 | Schiller et al. | 725/34 |
| 2007/0107011 A1 | 5/2007 | Li et al. | |
| 2008/0155590 A1* | 6/2008 | Soukup et al. | 725/34 |

FOREIGN PATENT DOCUMENTS

| | | |
|---|---|---|
| WO | WO0247384 | 6/2002 |
| WO | WO2006097825 | 9/2006 |

OTHER PUBLICATIONS

U.S. Appl. No. 11/425,566, filed in the name of A. Acharya et al., filed Jun. 21, 2006 and entitled "User Interface Methods and Apparatus for Roaming Access to Subscription Services."

U.S. Appl. No. 11/399,872, filed in the name of A. Acharya et al., filed Apr. 7, 2006 and entitled "Delivery of Subscription Services to Roaming Users Through Head End Equipment."

U.S. Appl. No. 11/399,726, filed in the name of A. Srivastava et al., filed Apr. 7, 2006 and entitled "Method and Apparatus for Delivering Subscription Service Content to Roaming Users."

International Search Report, PCTUS2008007191, WO, Nov. 18, 2008.

* cited by examiner

TARGETED ADVERTISEMENT INSERTION WITH INTERFACE DEVICE ASSISTED SWITCHING

FIELD OF THE INVENTION

The present invention relates generally to signal distribution systems, and more particularly to techniques for providing targeted advertisements within such systems.

BACKGROUND OF THE INVENTION

Conventional signal distribution systems include, by way of example, cable television systems, satellite television systems, and systems providing Internet protocol television (IPTV) over digital subscriber line (DSL) or fiber. Such systems are configured to distribute media streams associated with subscription television services to system subscribers or other users. Typically, a given subscriber is provided with an interface device, such as a set-top box or receiver, for communicating with system head end equipment. The interface device is configured to permit the subscriber to receive, on a television or other presentation device coupled to the interface device at a given location, the particular subscription television services to which that subscriber is entitled by virtue of the subscription. A given subscription may encompass, by way of example, a number of basic broadcast channels, as well as one or more premium programming channels, such as movie channels, sports channels, specialty channels, pay-per-view channels, on-demand video channels, etc.

A number of techniques are known for providing targeted advertisements in a signal distribution system of the type described above. One example is described in PCT International Publication No. WO 02/47384, entitled "Method and Apparatus for IP Multicast Content Distribution System Having National and Regional Demographically Targeted Advertisement Insertion." In this technique, demographic targeting of inserted advertisement content is accomplished on a per-stream basis at a regional network level by modifying header information during a packet replication process.

A problem with these and other known techniques is that the advertisement insertion process is typically carried out entirely in head end equipment of the system, so as to be fully transparent to the interface device. Thus, the interface device at the user location is not even aware that the targeted insertion is taking place, and cannot distinguish between a stream having inserted targeted advertisements and an ordinary stream. This type of arrangement unduly limits the flexibility of the system, and may prevent it from achieving a desired level of granularity in its targeting of advertisements to particular groups of users. It also makes it difficult to adapt the insertion process to situations such as a user changing a channel while a targeted advertisement is being played.

Accordingly, a need exists for improved techniques for targeted advertisement insertion in cable, satellite and IPTV systems, as well as other types of signal distribution systems.

SUMMARY OF THE INVENTION

The present invention in the illustrative embodiments provides techniques for targeted advertisement insertion which directly involve a set-top box or other interface device in the insertion process.

In accordance with one aspect of the invention, advertisements or other targeted information are delivered to a set-top box or other user interface device of signal distribution system. A detection server of the system detects at least one cue associated with a first media stream, and generates timing information from the detected cue. The timing information is signaled to the interface device. An advertisement server of the system generates a second media stream containing targeted information for delivery to the user interface device. The user interface device switches from the first stream to the second stream based on the timing information. The timing information may also be signaled by the detection server to the advertisement server, for use in controlling generation of the second stream.

In one of the above-noted illustrative embodiments, the advertisement server generates multiple ad streams, and a given interface device of the system switches from an original stream to a particular one of the multiple ad streams that is targeted to that interface device in accordance with user demographic information. The given interface device may then switch back to the original stream, or may switch to one or more additional targeted ad streams before returning to the original stream. Thus, the original stream can be replaced with any number of targeted ad streams depending on user demographics. Such an arrangement allows ads to be targeted to interface devices on a per-user basis.

The detection server and advertisement server may be implemented as separate servers, or as respective server components of a single server. These elements may be incorporated into head end equipment of the signal distribution system.

The illustrative embodiments advantageously facilitate the provision of targeted advertisements in a wide variety of signal distribution systems, with enhanced flexibility and a greater ability to achieve desired levels of targeting granularity. For example, a given implementation can provide targeted advertisement insertion on a per-subscriber basis in a subscription television system. As another example, targeted advertisements can be inserted even when a user changes from a first channel to a second channel that is in the midst of a commercial break. In one arrangement of this type, if the second channel is itself in commercial break, a targeted advertisement from a designated ad stream or local storage can be provided during the commercial break on the second channel, depending on the amount of time remaining in the commercial break.

DETAILED DESCRIPTION OF THE INVENTION

The invention will be illustrated herein in conjunction with illustrative embodiments of signal distribution systems and associated targeted advertisement insertion techniques. It should be understood, however, that the invention is not limited to use with the particular systems and techniques described, but is instead more generally applicable to any signal distribution application in which it is desirable to provide enhanced flexibility and effectiveness in delivery of targeted advertisements. For example, although described herein primarily in the context of television services, the techniques of the invention can also be adapted in a straightforward manner to audio services, such as subscription audio services delivered via digital satellite radio systems. Systems of the latter type are considered a type of signal distribution system as that term is used herein.

In one embodiment, a signal distribution system is configured to include targeted advertisement insertion functionality. Unlike conventional arrangements, this embodiment utilizes a set-top box (STB) or other user interface device of the system to actively assist in the targeted advertisement insertion process.

Figure 1A:
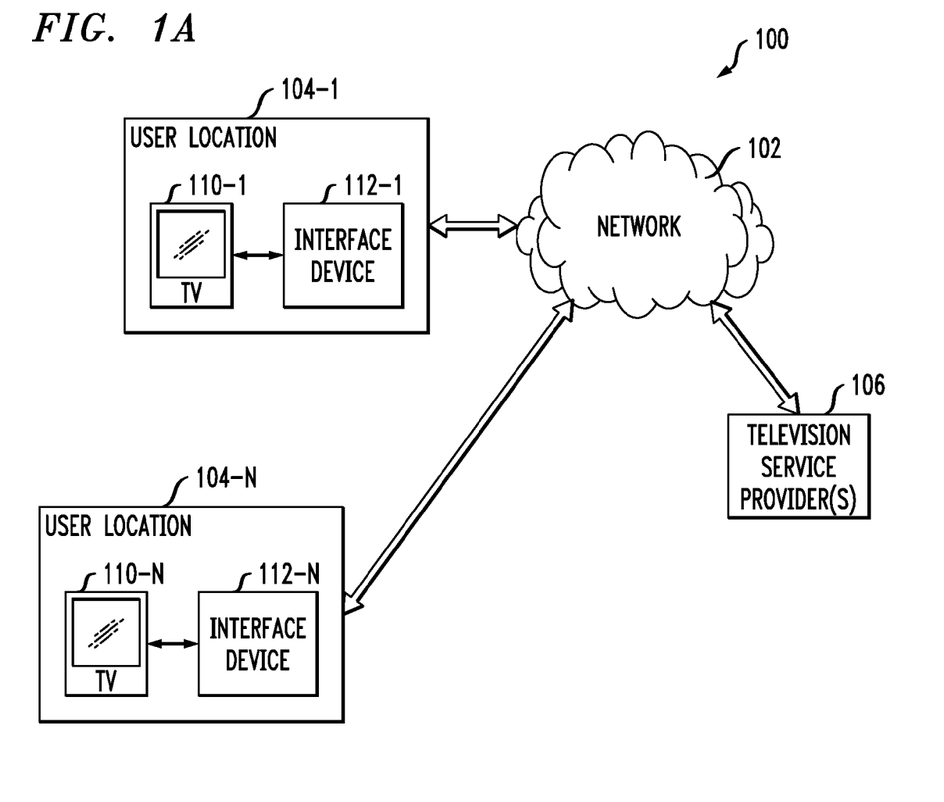
FIG. 1A shows an illustrative embodiment of a signal distribution system in accordance with the invention.

Referring now to FIG. 1A, a signal distribution system 100 comprises a network 102 over which equipment at user locations 104-1 through 104-N communicates with one or more television service providers 106. The signal distribution system 100 may comprise, by way of example, a cable television system, a satellite television system, an IPTV system, or portions or combinations of these and other systems. Element 106 may comprise otherwise conventional service provider equipment, including, for example, head end systems, satellites, servers, etc. The equipment at a given location 104-*i*, i=1,... N, comprises a television 110-*i* coupled to an interface device 112-*i*. The interface devices 112 for purposes of the illustrative embodiments will be assumed to be STBs, but in other embodiments may comprise, for example, receivers, computers, or other processor-based devices, in any combination. Such devices are also referred to herein as user interface devices. A given device of this type allows one or more users to access media streams that are delivered to the device via other elements of the signal distribution system.

The network 102 may comprise any type of communication network suitable for transporting signals associated with the provision of television services, and the invention is not limited in this regard. For example, portions of the network 102 may comprise local networks, wide area networks, the Internet, etc.

A given one of the locations 104 may comprise, for example, a designated home location of a particular system subscriber. Thus, it is a location at which the subscriber is permitted to access one or more television services by virtue of his or her subscription. It should be noted that the term "subscriber" as used herein is intended to encompass other subscribing entities, such as businesses or organizations, in addition to individuals or families. Subscribers may be viewed as examples of what are more generally referred to herein as users, and the term "user" is thus intended to include subscribers as well as other types of users. Also, the term "home" should be construed broadly, and is not intended to be restricted to individual or family residences. Instead, the home location of a particular subscriber may be any location at which that subscriber ordinarily accesses television services in accordance with the subscription. A home location may therefore be at a business facility, hotel or other building, in a means of conveyance such as an automobile, train, bus or airplane, or at any other suitable location.

The techniques of the present invention may be utilized in conjunction with the provision of subscription television services to roaming users. In such an arrangement, one of the locations 104 may be a home location of a given subscriber and another of the locations may be a remote location of that subscriber. Additional details regarding roaming subscription television services may be found in, for example, U.S. patent application Ser. No. 11/130,329, filed May 16, 2005 and entitled "Method and Apparatus for Providing Remote Access to Subscription Television Services," U.S. patent application Ser. No. 11/399,726, filed Apr. 7, 2006 and entitled "Method And Apparatus for Delivering Subscription Service Content to Roaming Users," U.S. patent application Ser. No. 11/399,872, filed Apr. 7, 2006 and entitled "Delivery of Subscription Services to Roaming Users Through Head End Equipment," and U.S. patent application Ser. No. 11/425,566, filed Jun. 21, 2006 and entitled "User Interface Methods and Apparatus for Roaming Access to Subscription Services," all commonly assigned herewith and incorporated by reference herein.

Other aspects of exemplary signal distribution systems in which the techniques of the present invention may be implemented are described in U.S. patent application Ser. No. 11/145,832, filed Jun. 6, 2005 and entitled "Signal Distribution System with User-Defined Channel Comprising Information from an External Network," and U.S. patent application Ser. No. 11/427,879, filed Jun. 30, 2006 and entitled "Signal Distribution System with Interrupt Processing and Trick Play Functionality," both commonly assigned herewith and incorporated by reference herein.

It is to be appreciated that the invention does not require any particular geographic relationship between the various user locations 104. Accordingly, the locations may all be within the same local area, served by a common service provider. As another example, two or more of the locations may be more geographically remote from one another, such as in different regions of the same country, or even in different countries, with the two locations being serviced by different television service providers. It is also possible that two or more of the locations may be in a common building or other structure, for example, in respective first and second apartments of an apartment building. Numerous alternative arrangements are possible, as will be apparent to those skilled in the art.

Figure 1B:
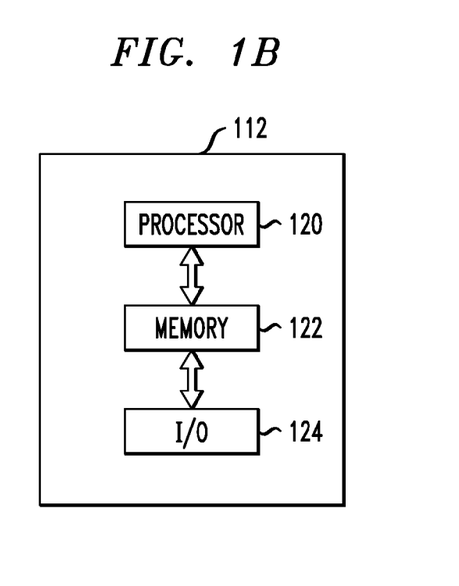
FIG. 1B shows a simplified block diagram of an interface device of the FIG. 1A system.

FIG. 1B illustrates that a given one of the interface devices 112 comprises a processor 120, a memory 122, and input/output (I/O) elements 124. The processor 120 may be, e.g., a microprocessor, a microcontroller, an application-specific integrated circuit (ASIC) or other type of processing device, as well as portions or combinations of such devices. The memory 122 may include an electronic random access memory (RAM), a read-only memory (ROM) or other type of storage device, as well as portions or combinations of such devices. The processor 120 and memory 122 are used in storage and execution of one or more software programs for assisting in targeted advertisement insertion, as will be described in greater detail below. For example, an ad insertion software agent, intelligent application or other type of software program may be downloaded to or otherwise stored in the interface device for use in performing the interface device portion of an ad insertion process. Examples of such arrangements will be described below in conjunction with FIGS. 2 through 4.

The particular signal distribution system configuration described above should be viewed as an illustrative example of such a system, and it is to be understood that the invention can be implemented using other types and configurations of system components.

The present invention in an illustrative embodiment deals with delivery of targeted advertisements to users via an IPTV system. It is to be appreciated that the described techniques can be extended in a straightforward manner to be implemented using other types of systems, such as cable or satellite television systems.

Generally, a targeted advertisement insertion technique in this embodiment directly involves the interface device 112 in the insertion process. An advertisement insertion system associated with a given television service provider 106 detects cues associated with a first media stream, generates timing information from the detected cues, signals the timing information to the user interface device, and generates a second stream containing targeted information for delivery to the interface device. The interface device switches from the first stream to the second stream based on the timing information.

A number of illustrative embodiments of the above-noted targeted advertisement insertion technique will now be described with reference to FIGS. 2, 3 and 4. Again, it will be assumed for description of these illustrative embodiments that the interface device 112 is an STB, although other types of interface devices could be used.

Figure 2:
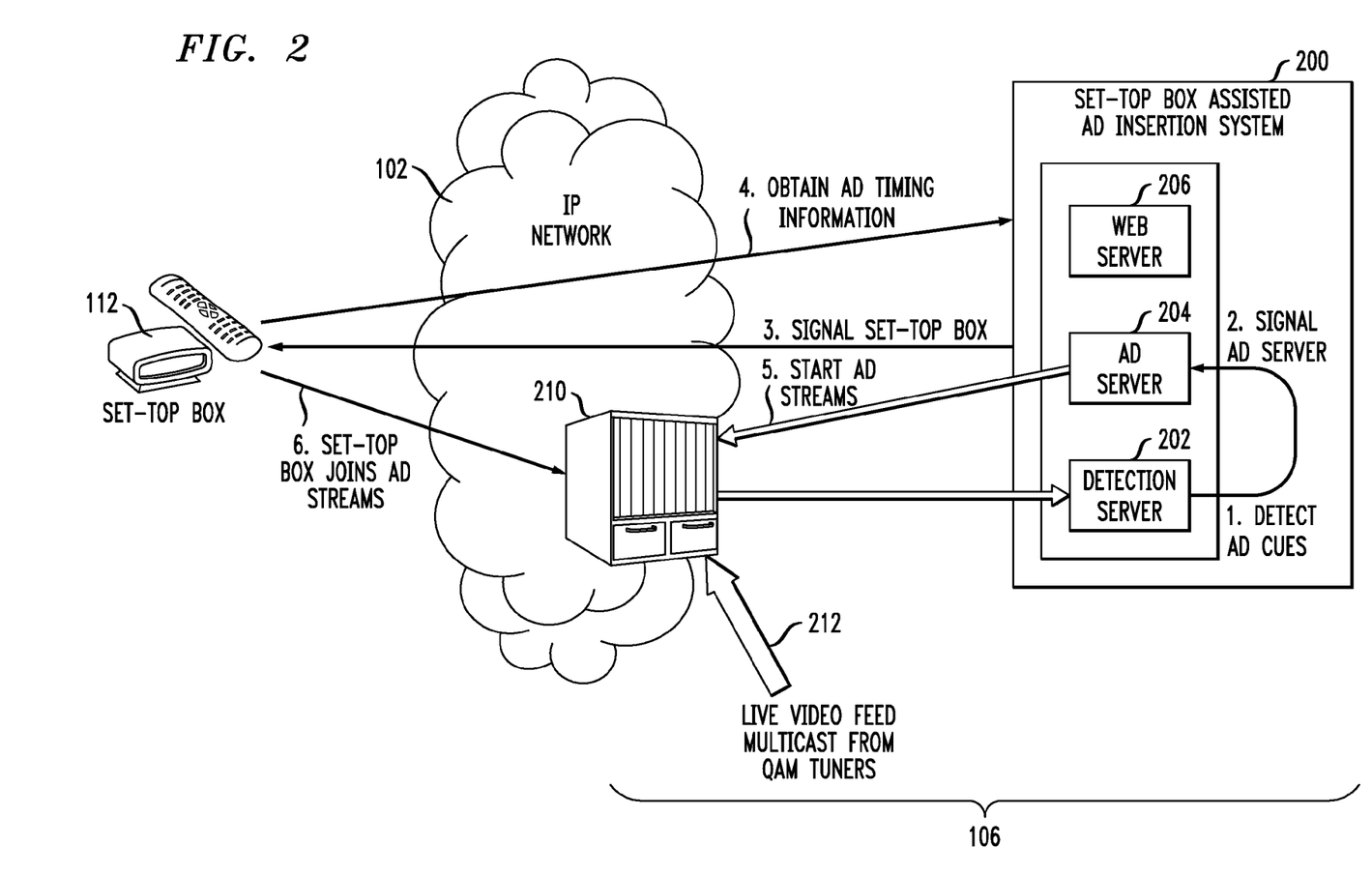
FIG. 2 shows one possible implementation of interface device assisted advertisement insertion process in the FIG. 1A system.

FIG. 2 shows a more detailed view of one possible implementation of a targeted advertisement insertion process in the system 100. In this embodiment, the network 102 comprises an IP network over which multiple streams are delivered to STB 112 via IPTV network head end equipment associated with a television service provider 106. The advertisement insertion process in this embodiment and others described herein may be implemented at least in part in the form of software that is executed by system elements such as one or more interface devices and equipment of one or more television service providers. Although illustrated in the context of IPTV, the described services can be adapted in a straightforward manner for use in other types of signal distribution systems, such as cable and satellite television systems.

In the FIG. 2 arrangement, an STB-assisted ad insertion system 200 comprises a detection server 202, an ad server 204 and a web server 206. The servers may each comprise separate stand-alone servers, or two or more of them may be implemented on a common processing platform. For example, these servers may be implemented as servlets of a larger ad insertion system server. The ad insertion system is coupled via a network element 210 to IP network 102. Head end equipment, not explicitly shown in the figure, provides a live video feed 212 that may be multicast from conventional quadrature amplitude modulation (QAM) tuners or other receiver elements of the head end equipment to the network element 210 and other similar network elements. Examples of such head end equipment will be described in greater detail below in conjunction with FIG. 4.

The operation of the FIG. 2 embodiment will now be described with reference to the step numbers shown in the figure.

In Step 1, an original content stream associated with live video feed 212 is provided by network element 210 to the detection server 202. The detection server processes the original content stream to detect ad markers or other ad cues in that stream. The detection server utilizes the detected ad cues to generate timing information. For example, the detected cues may be utilized to provide timing information indicating the beginning and duration of a given ad slot in the original content stream. The ad cues may comprise, by way of example, conventional SCTE-35 signaling messages inserted into packets of an MPEG stream. In one embodiment, the detection server parses program association table (PAT) and program map table (PMT) information in an MPEG header to obtain the program identifier (PID) of an elementary stream (ES) carrying the ad cues, and monitors the ES to locate packets containing the ad cues. When these packets are found, usually about 8-10 seconds before the corresponding ad slot, they are processed to obtain the precise timing information as described by a corresponding presentation time stamp (PTS).

In Steps 2 and 3, the timing information determined by the detection server 202 from the detected ad cues is signaled to the ad server 204 and the STB 112, respectively.

The timing information may be communicated by the detection server 202 to the STB using a short message on a signaling channel. For example, a short message such as "CHANNEL=2, START_PTS=413245896, DURATION=60000" transmitted on a multicast channel may be used to inform multiple STBs that a 60-second ad slot is about to come on Channel 2 starting at the specified video PTS.

Signaling of timing information to the STB 112 may optionally involve an additional step, shown as Step 4 in the figure, in which the STB obtains the timing information from the ad insertion system. For example, if a user changes a channel on the STB, the STB may respond by requesting timing information for the new channel. As another example, Step 4 may be initiated responsive to an indication from the ad insertion system that timing information is available. As indicated above, such timing information may be directly provided to the STB by the detection server via communications associated with Step 3.

In other embodiments, the detection of the timing information may be done locally at the STB 112. Thus, an ad cue detection mechanism similar to that used by detection server 202 may be implemented locally at the STB. Such a detection mechanism may be implemented as a software agent running on the STB that continuously processes the content stream to monitor for the presence of ad markers or other ad cues. This local detection approach has a number of disadvantages relative to central detection and signaling approach illustrated in FIG. 2. For example, it consumes additional CPU and memory resources on the STB. Also, as the ad cues are only present in the content stream, the STB implementing local detection can only be aware of the beginning of an ad slot of the currently selected channel. If a user switches to a new channel which is in the middle of an ad slot, the STB would not be able to detect the presence of that ad slot, as it would not have seen the associated ad cues for the new channel. This loss of targeted ad insertion opportunity can be severe, particularly if users frequently switch between channels that carry ads at somewhat overlapping times. For instance, consider an example of a user who is watching the Tonight Show on NBC when it goes to commercial, and after watching 10 seconds of an ad, the user switches to the Letterman show on CBS. If the Letterman show is 20 seconds into a commercial break defined by a two-minute ad slot, the local detection approach would not be aware of that ad slot. Therefore, an opportunity to show a targeted relevant ad for one minute and 40 seconds will be missed.

The preferred remote detection approach illustrated in FIG. 2 overcomes these problems, as the STB can request timing information responsive to a channel change in conjunction with Step 4, or such information can be directly signaled to the STB in conjunction with Step 3. It also conserves STB resources by eliminating the need for each STB to monitor for ad cues, and can be implemented using a small signaling overhead. The remote detection approach allows monitoring of ad slots on all channels at all times irrespective of the currently played channel. Using remote detection, if a user commands the STB to switch to a channel that is currently in an ad slot, the STB can temporarily ignore the channel change request and instead switch to an appropriate targeted ad stream. Based on the timing information for the new channel as supplied by the detection server, the STB can calculate the remaining ad slot time and return the user to the requested channel after that time interval.

Remote detection also provides additional insertion opportunities for high-impact ads of short duration. For example, when a user switches to a channel which has a very small remaining ad slot time (e.g., 10-15 seconds) it may not be appropriate to switch to the targeted ad stream as the last 10 seconds of a one-minute ad may not be able to carry the desired message and make an impact. Instead, the STB can be configured to detect such scenarios, and instead play appropriate locally-stored ads of short duration that can generate high impact. The particular remaining ad slot time that triggers this playing of local ads can be fixed or selectable by a system administrator.

In Step 5, the ad server 204 utilizes the timing information provided by the detection server 202 to start one or more ad streams. Thus, the ad streams are started at the appropriate times as indicated by the timing information. These streams are delivered to the STB over the IP network 102.

A number of different techniques may be used to start the ad streams. For example, the ad server 204 may start the ad streams at times indicated by the detection server 202. These ad streams are started at the precise times as communicated by the detection server, and do not pass through the detection server. An example of this technique will be described below in conjunction with FIG. 4A.

In an alternative embodiment, the detection server may direct the ad server to prepare ad content for streaming at approximate times, but the streams are not actually started by the ad server. Instead, based on a particular video PTS denoting the beginning of a given ad slot, the detection server may connect to the ad server and itself directly control the starting of the streams. Such an approach can provide greater accuracy in timing the start of the ad streams. The perceptible experience of stream switching is reduced because the PTS describing the beginning of the ad slot is visible to the detection server. Again, the ad streams when started do not pass through the detection server. FIG. 4B to be described below shows an example of an approach of this type.

Another alternative approach is for the detection server 202 to direct the ad server 204 to stream the ad streams back to the detection server at approximate times. The detection server will then continuously monitor the ad streams, and at the PTS denoting the beginning of a given ad slot will release the ad streams for delivery over the network. This approach completely eliminates any perceptible loss of stream continuity at the time of switching. An example of this approach will be described below in conjunction with FIG. 4C.

In Step 6, the STB utilizes the timing information previously provided to it by the detection server 202 to join the appropriate ad streams at the appropriate times. The STB thus switches from an original content stream to an ad stream at an appropriate time as determined based on the timing information. The timing information is also utilized to allow the STB to return from the ad stream to the original content stream at the appropriate time. For example, as noted above, the timing information may include a specified duration of the targeted ad. The STB can thus start a timer when it switches to the ad stream, and switch back to the original stream when the timer expires.

In switching to an ad stream, an ad insertion software agent on the STB may check the current channel being played with a channel described in an ad notification message. If the two channels match, the STB software agent continues to monitor the PTS of the current channel. Just prior to the PTS reaching the designated value, the software agent signals the STB to switch to the targeted ad stream. This signaling may occur, for example, tens to hundreds of milliseconds prior to the PTS reaching the designated value, depending upon the STB latency.

A mapping of targeted ad streams to particular demographic groups may be stored in a table in a non-volatile memory of the STB. The STB itself may also or alternatively be assigned to one or more demographic groups. For example, the STB may belong to several demographic groups simultaneously or may be assigned unique demographic groups for respective times of the day in order to capture the fact that different family members may be viewing television at different times.

In order to ensure proper return from a given targeted ad stream, the ad insertion software agent in the STB monitors the selected channel and signals the STB to switch back to the original content stream at the end of the current ad slot time. However, if the user switches to another channel during the current ad slot, return to the original stream is canceled. Calculation of the ad slot time may be done, for example, by running a timer for the duration of ad slot as determined by remote or local detection as previously described. Alternatively, the STB can also use the PTS information from the ad stream to determine the precise moment to switch back to the original content stream.

The stream switching in the STB 112 may make use of conventional signaling protocols, such as Internet group management protocol (IGMP). It should be noted, however, that IGMP join and leave latencies in a given embodiment may result in a presentation of a blank screen between switching operations. In order to minimize this undesirable effect, the ad insertion software agent may send a join command for an ad stream a short time (e.g., tens to hundreds of milliseconds) prior to signaling the STB to switch to that ad stream. Similarly, the ad insertion software agent may send a join command for the original content stream a short time before it signals the STB to switch back to that original stream.

It is to be appreciated that the FIG. 2 targeted ad insertion process is presented by way of illustrative example only, and numerous alternative arrangements may be used in implementing interface device assisted ad insertion using the techniques of the invention.

Figure 3:
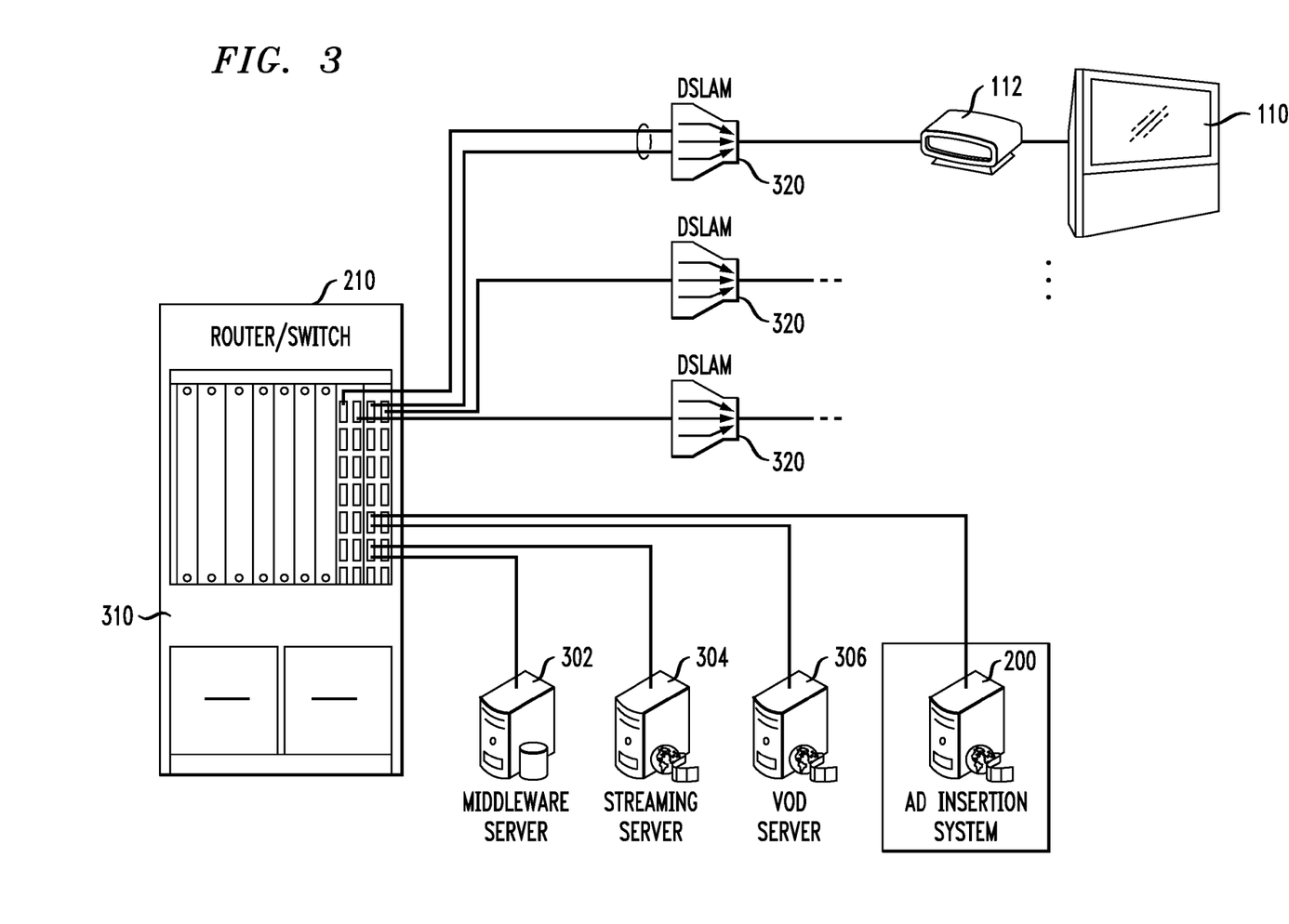
FIG. 3 is a more detailed view of a portion of a signal distribution system in an illustrative embodiment.

FIG. 3 shows in greater detail the manner in which the ad insertion system 200 can be interfaced to the network element 210 and the STB 112 in an illustrative embodiment. In this example, the ad insertion system comprises a single server coupled to a line card of the network element 210. The network element is assumed in this example to comprise a router or switch associated with the IP network 102. For example, the network element may comprise a Gigabit Ethernet switch or other video switch suitable for processing streams for transmission to the STB 112. The portion of the signal distribution system shown in FIG. 3 further comprises additional servers coupled to lines cards of the network element, including a middleware server 302, a streaming server 304, and a video on demand (VOD) server 306. One or more line cards of the network element 210 are also coupled via DSL access multiplexers (DSLAMs) 320 to STB 112 or other STBs of the system.

In an alternative embodiment, the ad insertion system 200 may instead be implemented in whole or in part internally to the network element 210, utilizing one or more line cards or other processing devices of that network element.

Figure 4A:
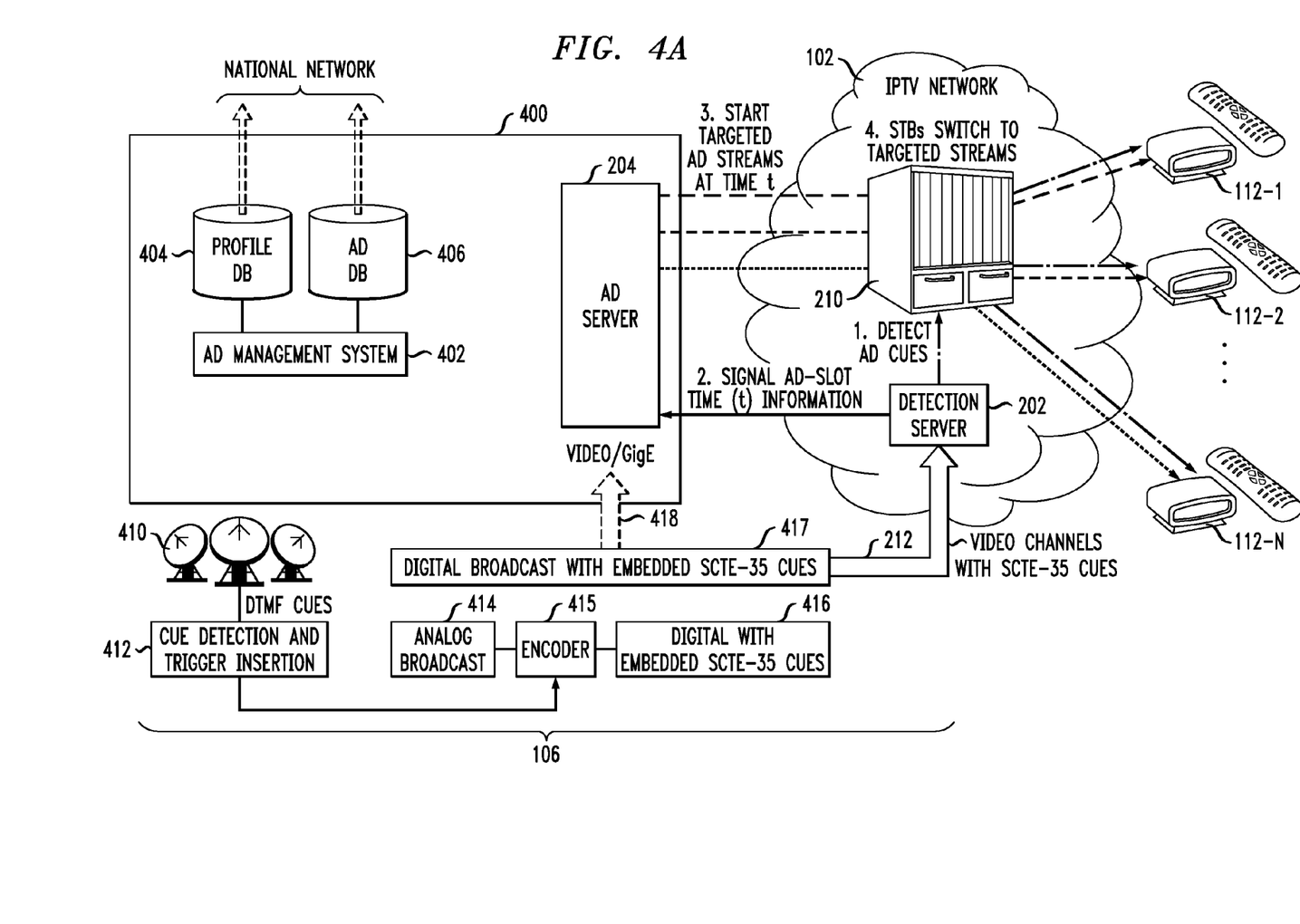
FIGS. 4A, 4B and 4C are diagrams showing different techniques for interface device assisted advertisement insertion in illustrative embodiments.
Figure 4B:
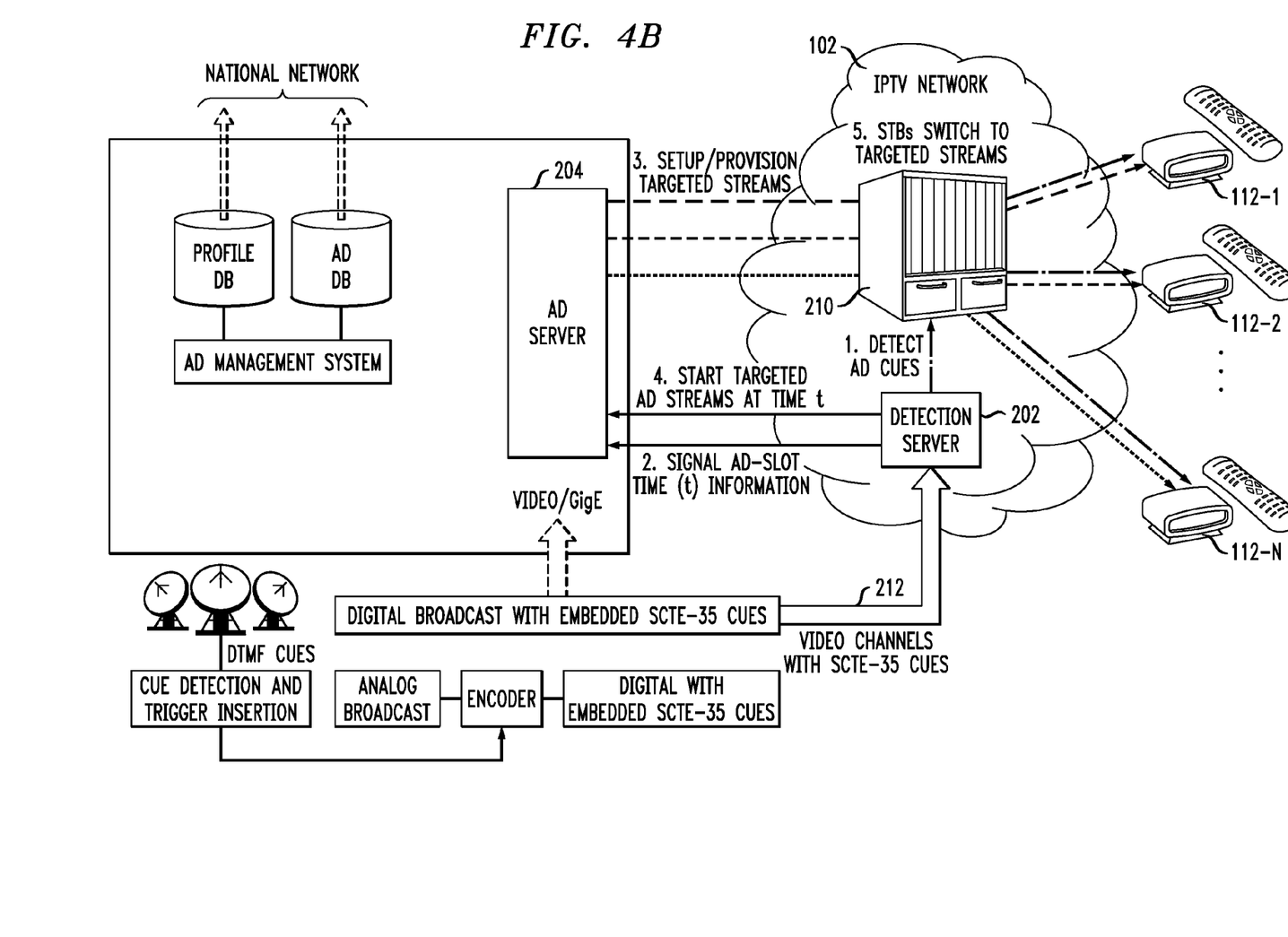
Figure 4C:
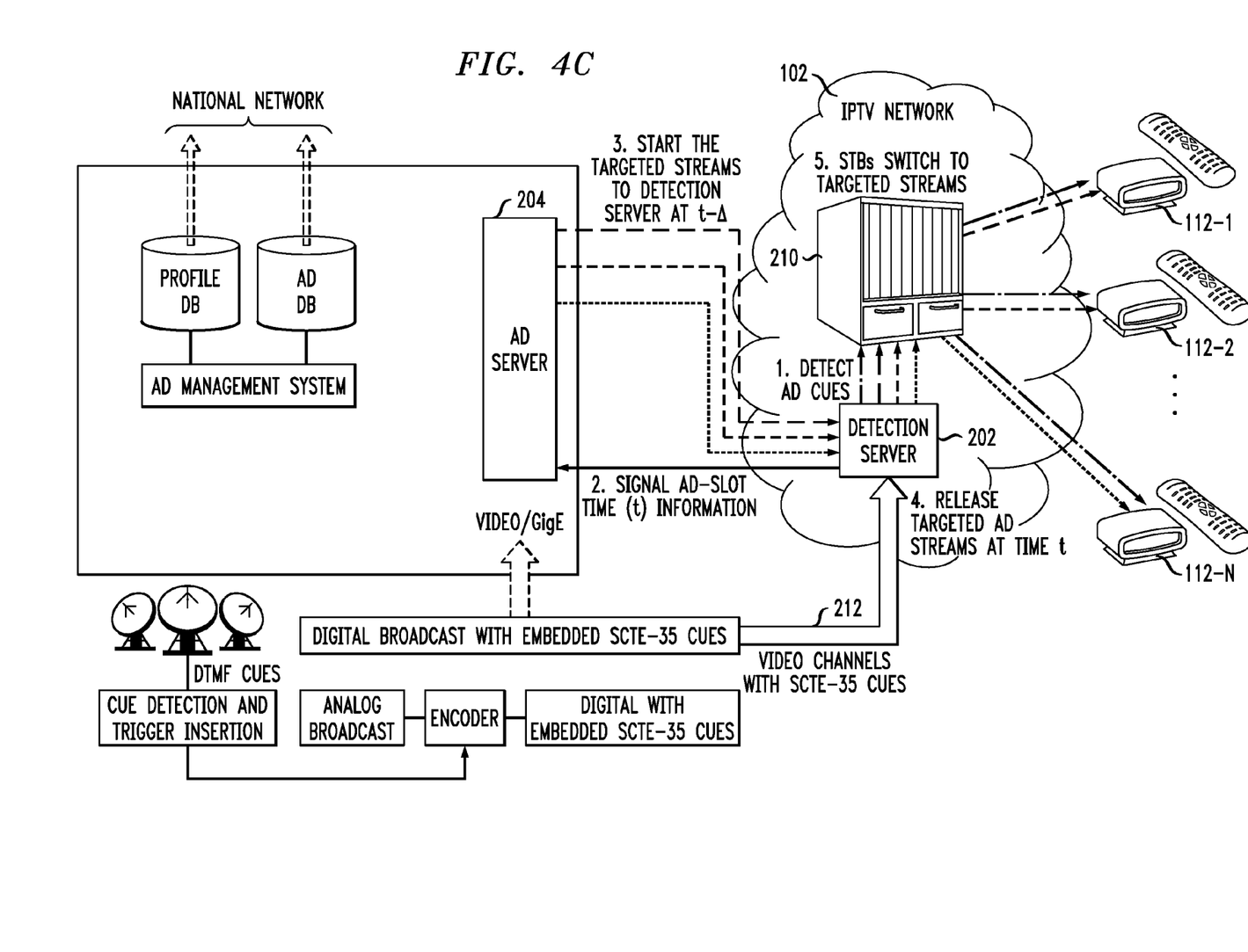

FIGS. 4A, 4B and 4C show other possible implementations of the signal distribution system 100 of FIG. 1A. In these embodiments, referring initially to FIG. 4A, network 102 comprises an IPTV network which includes network element 210. Head end equipment associated with a given service provider 106 comprises equipment 400 which includes an ad management system 402, a profile database 404, and an ad database 406. Also included in the equipment 400 is ad server 204 which operates substantially as previously described. The head end equipment further includes detection server 202, also configured to operate substantially as previously described.

Video signals are received in the system as shown in FIG. 4A via satellite antennas 410 having associated receiving equipment, such as the above-noted QAM tuners. The received video signals include analog broadcast signals 414 which are converted via an encoder 415 to digital signals 416 with embedded SCTE-35 cues, and digital broadcast signals 417 having embedded SCTE-35 cues. These signals are supplied to equipment 400 via a video connection 418, which may be a Gigabit Ethernet connection. The signals are also supplied as live video feed 212 to detection server 202, which interacts with the ad server 204 and with the STBs 112 via the network element 210. The live video feed 212, as indicated previously, comprises multiple video channels with embedded SCTE-35 cues.

The head end equipment may include a wide variety of additional or alternative elements utilizable to deliver content to subscribers via network 102. Such elements may include, for example, controllers, signal combiners, databases or other storage devices, middleware, IPTV servers, local television acquisition servers, or other typical head end elements, in any combination.

The arrangements shown in FIGS. 4B and 4C generally include the same elements as the FIG. 4A arrangement, but differ in terms of the manner in which the ad streams are started and the timing information is signaled. Each figure includes a number of steps which further detail the ad insertion process for the corresponding arrangement.

Referring now to the steps shown in FIG. 4A, the detection server 202 in Step 1 detects SCTE-35 cues in one or more of the video channels supplied via the live feed 212. At Step 2, the detection server signals timing information to the ad server 204. This information includes information denoting the time t at which a particular ad slot begins. In Step 3, the ad server 204 starts one or more targeted ad streams at the time t signaled by the detection server. Finally, in Step 4, the STBs 112 switch to the targeted ad streams.

The FIG. 4B arrangement is similar to that of FIG. 4A, but the detection server 202 directs the ad server 204 to setup or otherwise provision the ad streams at an approximate time prior to time t, as indicated in Step 3. The detection server then itself directs the starting of the streams at the precise time t, as indicated in Step 4. As before, the STBs 112 switch to the targeted ad streams, this time in Step 5.

In the FIG. 4C arrangement, the ad streams are provided by the ad server 204 to the detection server 202 for delivery to the STBs 112 via the network element 210. The detection server detects ad cues and signals the timing information to the ad server in respective Steps 1 and 2. The ad server in this arrangement starts the targeted ad streams at an approximate time given by t-$\Delta$, as indicated in Step 3, and delivers the streams to the detection server. The detection server in Step 4 releases the ad streams to the network element 210 at the precise time t. Again, the STBs switch to the targeted ad streams in Step 5.

It is to be appreciated that the particular types of head end equipment and other system elements as shown in FIGS. 4A through 4C are merely examples, and may be altered in other embodiments. For example, the Ethernet switches in the network 102 may be replaced with or combined with other types of switches or routing elements. Also, the detection server may be implemented in combination with the ad server on a common server or other processing platform, as in the FIG. 3 embodiment. These and other portions of an ad insertion system may be implemented using other arrangements of elements providing similar functionality as described herein.

Figure 5:
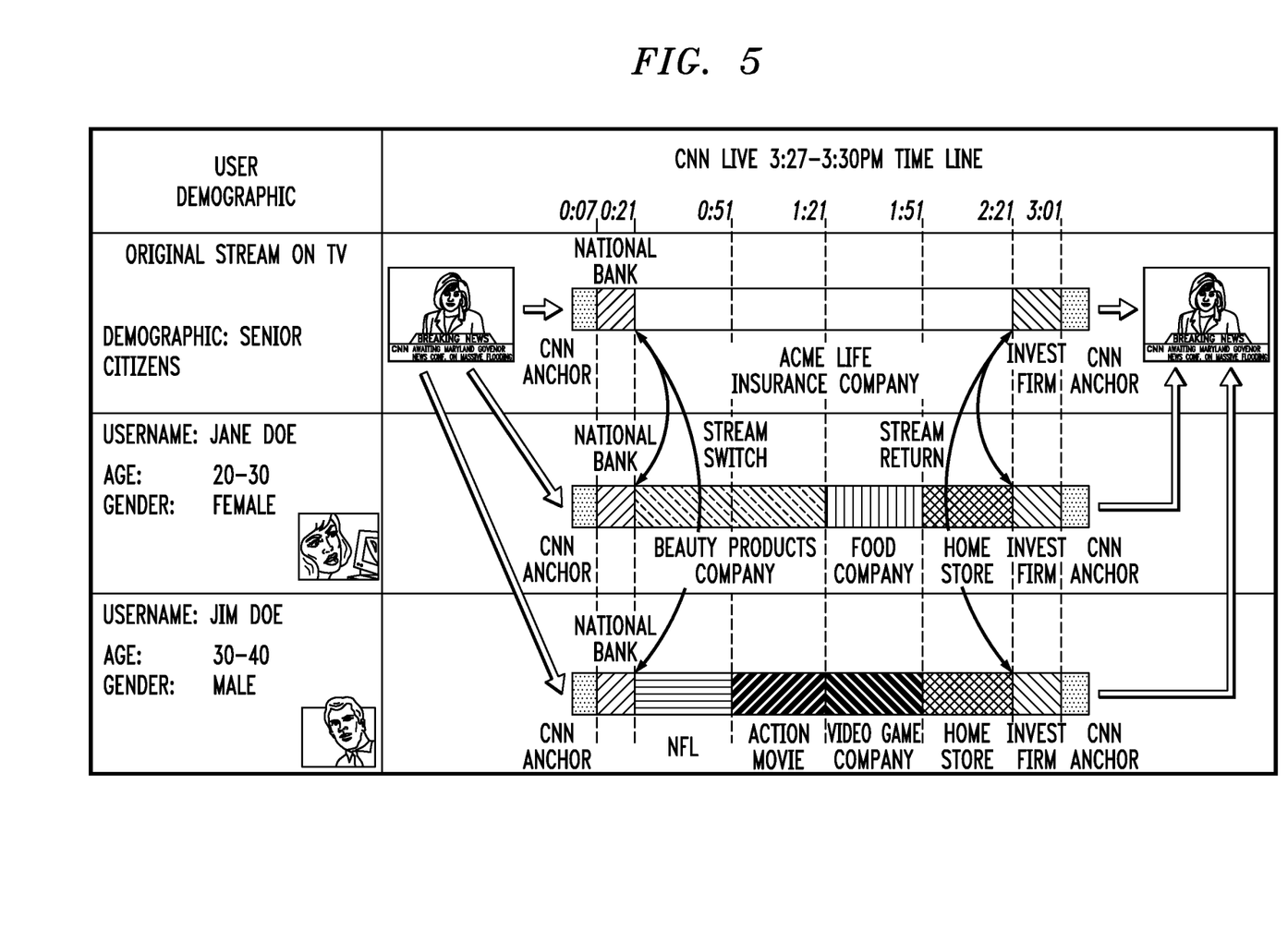
FIG. 5 shows an example of different advertisements being inserted in streams delivered to users in different demographic groups using one or more of the illustrative arrangements of FIGS. 2 through 4.

FIG. 5 illustrates the insertion of targeted advertisements in a given original content stream based on demographic groups of particular users. This insertion may be achieved using any of the illustrative arrangements previously described in conjunction with FIGS. 2 through 4, or using other embodiments of the invention. The original content stream in this example is a news program, namely a CNN program. An approximately three-minute portion of the program is shown, occupying a time range from 3:27 to 3:30 PM. There are three streams shown in the figure, the uppermost corresponding to the original stream that is shown by default without ad insertion, and targeted generally to senior citizens, and the two lower streams with ad insertion targeted to respective designated female and male demographics. It will be assumed that each of the different streams shown in this figure is generally associated with a different one of the STBs 112.

It can be seen that the original stream includes a short advertisement, followed by a longer advertisement targeted to seniors, followed by another short advertisement. The short advertisements are also part of the second and third streams. However, the second and third streams each include a targeted ad slot approximately two minutes in duration that is used to insert ads directed to the particular demographic groups. These targeted ads replace the single longer advertisement directed to seniors in the original stream. At a point in time denoted as 0:21, the STBs playing the second and third streams switch to respective targeted ad streams provided by the ad server 204 in the manner previously described. The targeted ad streams include ads that are more appropriate for the particular demographic, for example, NFL and video game ads for the male demographic. At a point in time denoted 2:21, the targeted ad slot ends, and the STBs playing the second and third streams switch back to the original stream as shown.

The particular switching arrangements illustrated in FIG. 5 are presented by way of example only. In other embodiments, shorter ads such as those before and after the ad slot may be replaced with locally-stored targeted ads, as previously described. Also, a given STB may have different demographic associations for different times of day, such that different types of targeted ads are presented via the same STB of the system depending on the particular time of day.

As indicated previously, an ad insertion software agent, intelligent application or other type of software program may be downloaded to or otherwise stored in the STB to provide support of the above-described ad insertion functionality.

The particular embodiments shown in FIGS. 2 through 4 are in the context of an IPTV system. However, as noted previously, the disclosed techniques can be adapted in a straightforward manner for use in other types of signal distribution systems, such as cable and satellite television systems.

The above-described embodiments of the invention are intended to be illustrative only. For example, as indicated above, the techniques can be applied to a wide variety of media delivery services, including audio services delivered via digital satellite radio, and to other arrangements for delivering signals associated with subscription or non-subscription media services. Further, the media streams that are delivered to an interface device associated with a given user may include any type of data, including, for example, audio, video, speech or other information signals, in any combination.

These and numerous other alternative embodiments within the scope of the following claims will be readily apparent to those skilled in the art.

We claim:

1. A method of delivering targeted information to a user interface device in a signal distribution system, the method comprising the steps of:
   detecting at least one cue associated with a first media stream;
   generating timing information from the detected cue;
   signaling the timing information to the user interface device; and
   generating a second media stream containing targeted information for delivery to the user interface device;
   wherein the user interface device switches from the first stream to the second stream based on the timing information;
   the timing information being signaled to the user interface device responsive to a request for such information received from the user interface device;
   the request being generated by the user interface device responsive to a channel change command received by that device; and
   wherein the method further comprises the steps of:
   processing the channel change command to determine if a requested channel is in a commercial break;
   responsive to determining that the requested channel is in a commercial break, determining an amount of time remaining until an end of the commercial break; and
   responsive to determining that the amount of time remaining until the end of the commercial break allows for delivery of at least a designated portion of the targeted information, temporarily ignoring the channel change command and providing the second stream to the user interface device.

2. The method of claim 1 wherein the targeted information comprises an advertisement.

3. The method of claim 1 wherein the interface device comprises a set-top box.

4. The method of claim 1 wherein the signaling step further comprises signaling the timing information to an advertisement server.

5. The method of claim 4 wherein the advertisement server initiates delivery of the second stream to the user interface device based on the timing information.

6. The method of claim 1 wherein the detecting and generating steps are implemented in a detection server of the system.

7. The method of claim 6 wherein the detection server directs an advertisement server to initiate generation of the second stream based on the timing information.

8. The method of claim 6 wherein the detection server directs an advertisement server to initiate delivery of the second stream to the interface device based on the timing information.

9. The method of claim 6 wherein the detection server receives the second stream from the advertisement server and initiates delivery of the second stream to the interface device based on the timing information.

10. The method of claim 6 wherein the detection server is coupled to the user interface device via a network element comprising at least one of a router and a switch.

11. The method of claim 10 wherein the detection server is implemented on a server platform coupled to a line card of the network element.

12. The method of claim 10 wherein the detection server is implemented at least in part on a line card of the network element.

13. The method of claim 6 wherein the detection server and an associated advertisement server that provides the second stream are implemented as respective server elements of a single common server.

14. The method of claim 1 wherein the user interface device switches back to the first stream after presentation of targeted information associated with the second stream.

15. The method of claim 14 wherein the user interface device is directed to join the first stream a designated amount of time prior to signaling the user interface device to switch back to the first stream.

16. The method of claim 1 further comprising:
   sending a join command for the second stream to the user interface device; and
   signaling the user interface device to switch from the first stream to the second stream;
   wherein the join command is sent a designated amount of time prior to signaling the user interface device to switch from the first stream to the second stream.

17. An article of manufacture comprising a non-transitory processor-readable storage medium having one or more software programs embodied therein, wherein the one or more software programs when executed implement the steps of the method of claim 1.

18. An interface device for use in a signal distribution system, the interface device comprising:
   a memory;
   a processor coupled to a memory; and
   interface circuitry
   wherein the interface circuitry receives first and second media streams from a network element of the signal distribution system;
   wherein the interface device switches under the control of the processor from the first stream to the second stream based on timing information signaled to the interface device via the network element, the timing information being generated from at least one cue detected in the first stream, the second stream containing targeted information for the user interface device;
   the timing information being signaled to the interface device responsive to a request for such information received from the interface device;
   the request being generated by the interface device responsive to a channel change command received by that device; and
   wherein the interface device further:
   processes the channel change command to determine if a requested channel is in a commercial break;
   responsive to determining that the requested channel is in a commercial break, determines an amount of time remaining until an end of the commercial break; and
   responsive to determining that the amount of time remaining until the end of the commercial break allows for delivery of at least a designated portion of the targeted information, temporarily ignores the channel change command and provides the second stream to the user interface device.

19. The interface device of claim 18 wherein said interface device comprises a set-top box of the signal distribution system.

20. The interface device of claim 18 wherein said interface device is combined with a presentation device into a single device.

21. An apparatus for use in delivering targeted information to a user interface device in a signal distribution system, the apparatus comprising:

head end equipment comprising at least one server;

wherein the head end equipment detects at least one cue associated with a first media stream, generates timing information from the detected cue, signals the timing information to the user interface device, and generates a second media stream containing targeted information for delivery to the user interface device;

wherein the user interface device switches from the first stream to the second stream based on the timing information;

the timing information being signaled to the user interface device responsive to a request for such information received from the user interface device;

the request being generated by the user interface device responsive to a channel change command received by that device; and     wherein the head end equipment further:

processes the channel change command to determine if a requested channel is in a commercial break;

responsive to determining that the requested channel is in a commercial break, determines an amount of time remaining until an end of the commercial break; and     responsive to determining that the amount of time remaining until the end of the commercial break allows for delivery of at least a designated portion of the targeted information, temporarily ignores the channel change command and provides the second stream to the user interface device.

22. The apparatus of claim 21 wherein the at least one server further comprises:

a detection server which detects the cue and generates the timing information from the detected cue; and     an advertisement server which generates the second stream responsive to the timing information.

* * * * *

UNITED STATES PATENT AND TRADEMARK OFFICE
CERTIFICATE OF CORRECTION

PATENT NO. : 8,949,886 B2
APPLICATION NO. : 11/764472
DATED : February 3, 2015
INVENTOR(S) : Swarup Acharya et al.

Page 1 of 1

It is certified that error appears in the above-identified patent and that said Letters Patent is hereby corrected as shown below:

In the claims:

Claim 9, column 11, line 59, please change "the advertisement server" to --an advertisement server--

Signed and Sealed this
Fifth Day of May, 2015

Michelle K. Lee
*Director of the United States Patent and Trademark Office*